United States Patent Office 3,162,549
Patented Dec. 22, 1964

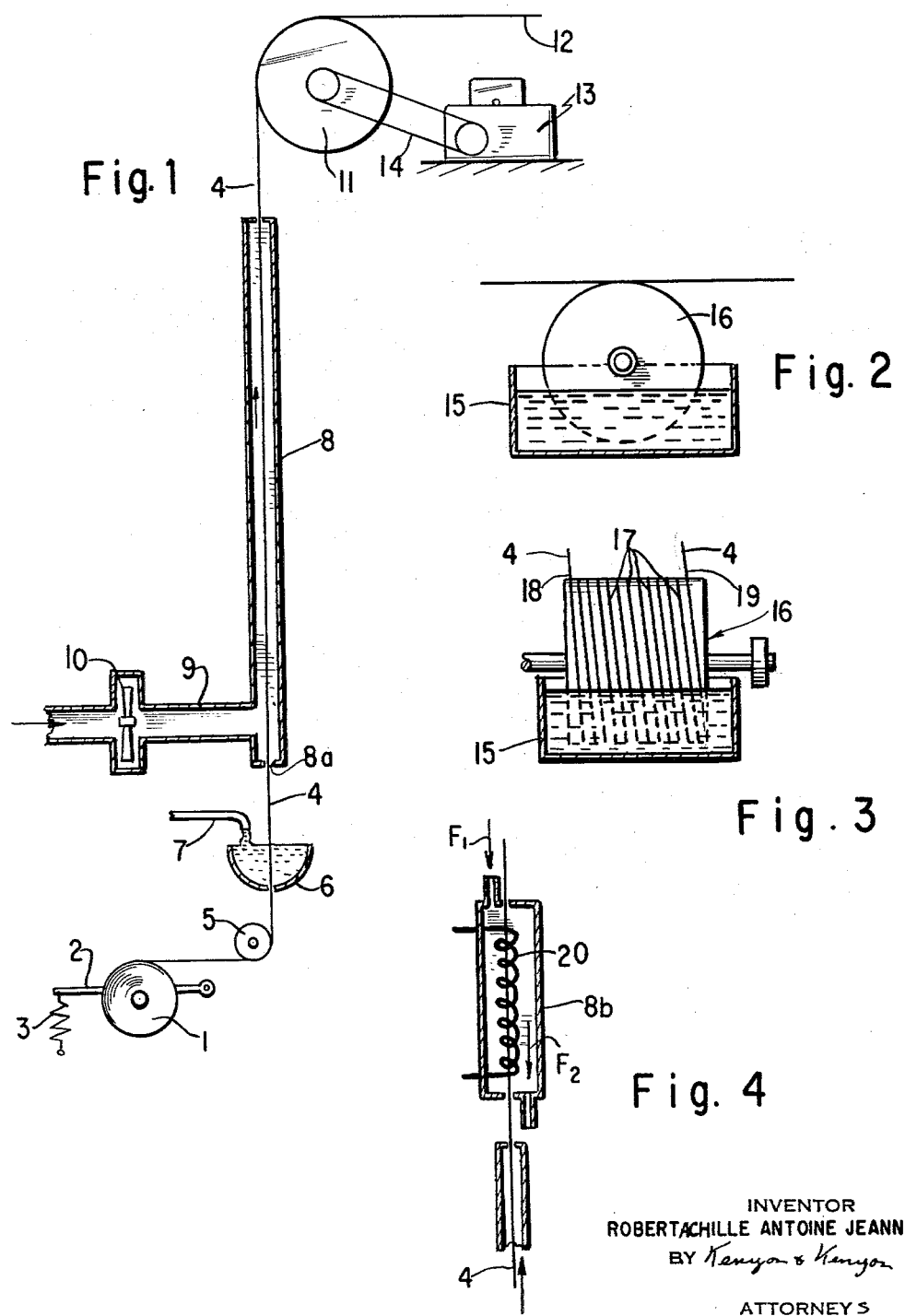

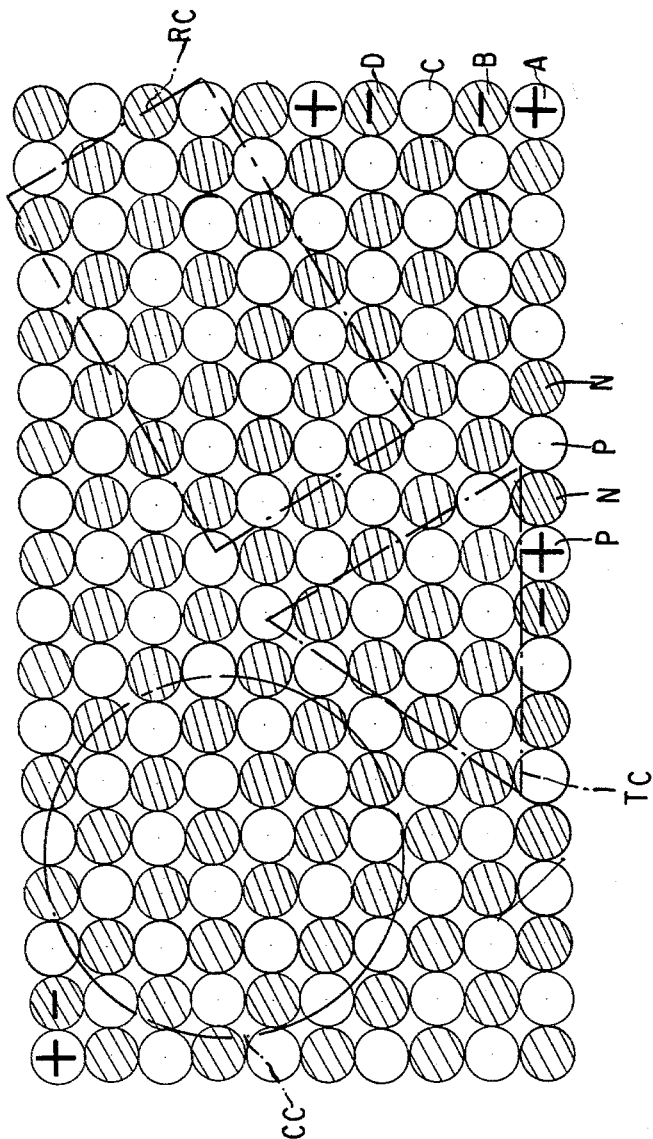

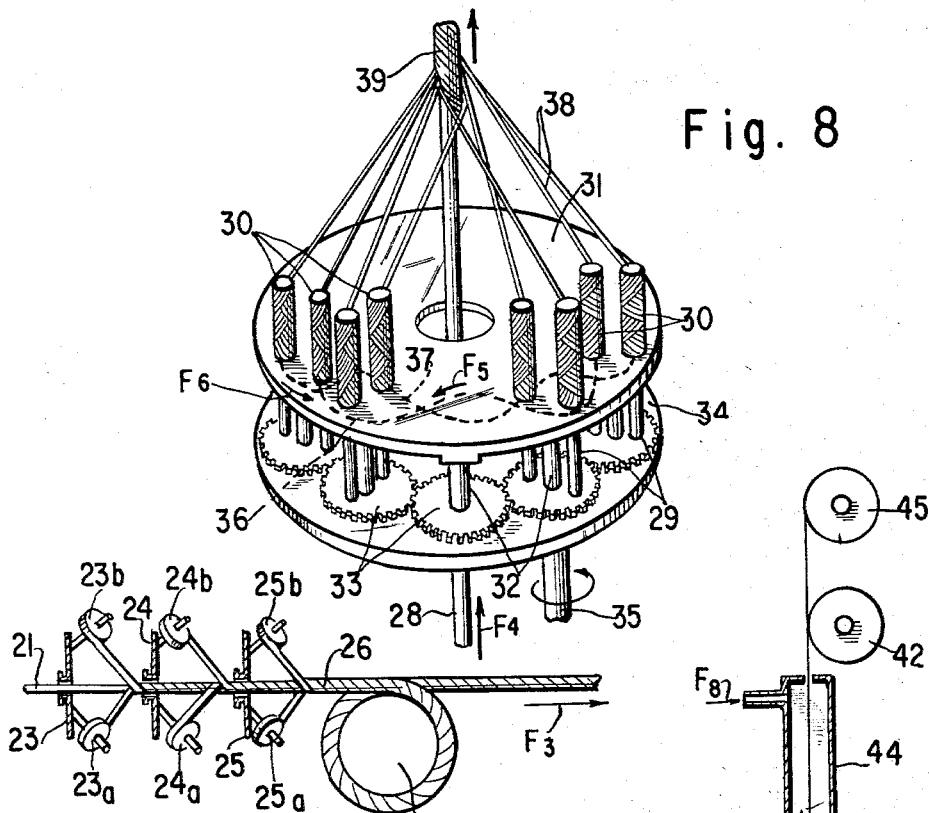
Fig. 8
Fig. 6
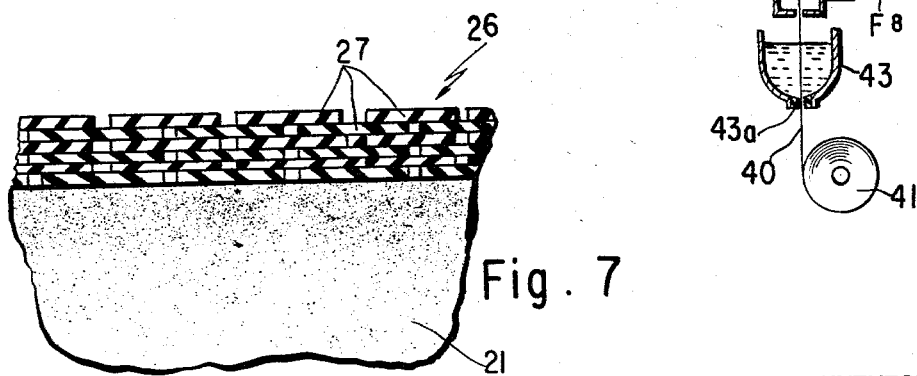
Fig. 9
Fig. 7

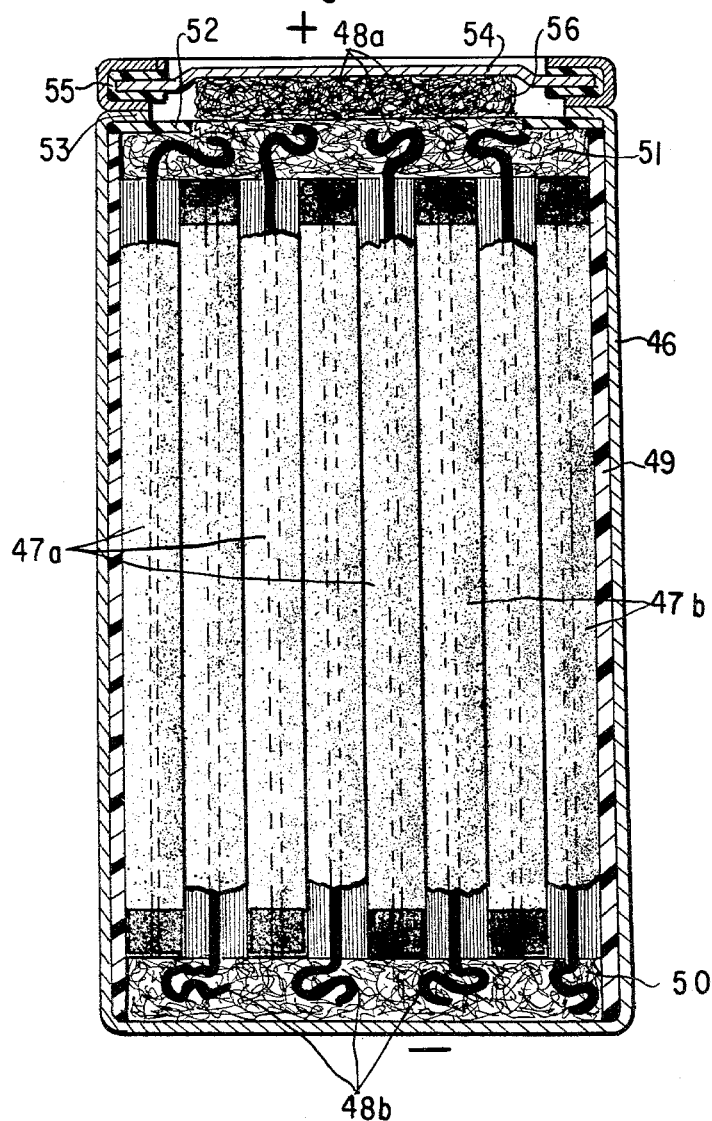

3,162,549
PROCESS FOR MANUFACTURING ELECTRODES FOR PRIMARY AND SECONDARY CELLS AND CELLS PRODUCED THEREWITH
Robert Achille Antoine Jeannin, Paris, France, assignor to Société des Accumulateurs Fixes et de Traction (Societe Anonyme), Romainville, France, a company of France
Filed July 24, 1962, Ser. No. 211,992
Claims priority, application France, July 25, 1961, 868,978; Jan. 5, 1962, 884,093; Jan. 12, 1962, 884,742
35 Claims. (Cl. 136—175)

This invention relates to electrodes for primary and secondary cells, to processes for their manufacture and to cells produced therewith.

A primary object of the present invention is a manufacturing process for producing wirelike electrodes for primary and secondary cells which electrodes are coated either with active material or with a sintered metal carrier whether or not impregnated with active material and ultimately covered with an insulating separator that is used to prevent any contact between electrodes of opposite polarities.

It is well known that the present technique of manufacturing electrodes has resulted in a gradual lessening of the differences which exist between the general shapes and kinds of electrodes used in primary cells and those used in secondary cells. Numerous special use primary cells are thus made with charged plates and separators similar to those in use in storage cells as, for instance, in the case of deferred-action cells of the zinc-silver type and those of the magnesium-silver chloride type.

Conversely, the so-called "rechargeable" cells which are in fact storage cells are now housed in casings once exclusively used for primary cells.

This situation causes drawbacks and even impossibilities. Thus, for instance, all plates even very thin, i.e., about 0.5 mm. thick, are unsuitable for or badly suited to the manufacture of cells having a shape other than prismatic. In the same way, such plates are not very well suited to the manufacture of miniature cells, which cells are coming more and more into demand as power sources, e.g., for transistor circuits.

On the other hand, the manufacture of thin electrode plates by continuous processes is very difficult and requires very well trained personnel, if large quantities are to be manufactured without occasioning wastes incompatible with the high cost of the involved materials.

An attempt to remedy these drawbacks has been made by manufacturing electrodes made with wirelike elements united together. Thus, the French Patent 1,008,183, discloses a process consisting in coating a metal wire with a porous sintered layer which is then impregnated with suitable active materials according to the kind and polarity of electrodes. Several such wires, thus coated, are placed beside each other so that they make plates. It is also possible to use such wires by winding them in a spiral.

One purpose of the present invention is to effect important improvements to this last-mentioned already known process.

The process according to the present invention is more especially notable in that it consists in coating with active material and ultimately covering with an insulating material, either during the coating operation or after it, at least two conductive wires, one of positive polarity and the other of negative polarity, then, in assemblying together lengths of wire cut from the said continuous wires to constitute bundles derived by associating rows of cut lengths in which rows the lengths of positive polarity alternate with lengths of negative polarity. In the case of wire electrodes wherein the active material is retained in a preferably porous metal carrier, the coating or covering of the wire is made in a continuous operation, e.g., by passing it through a tank containing a suspension of a conductive material powder, or of a material capable of becoming conductive in a reducing atmosphere, which is to produce a porous carrier after sintering, said suspension being in a viscous or pasty state, then by passing said suspension bearing wire through a drier and after that through a sintering oven and by then passing it in an impregnating tank in which it is helically wound on a barrel or similar member that is dipped in a suitable solution of salts of the metals which are to provide the active materials, said active materials being precipitated in the carrier on the wire, e.g., by the action of a sodium hydroxide solution on the metal salts.

It is further possible, while remaining within the scope of the invention, to deposit the material constituting the active material, preferably but not exclusively mixed with a conductive powder, directly onto the wire. It is then particularly advantageous to use either an active material possessing interlacing and felting properties, or a metal powder having the same properties which is to constitute the conductive carrier. The order of operations will be the same, omitting, however, the sintering operation and the impregnating operation, the latter being no longer necessary since the active material is provided by the process itself.

According to another characteristic and feature of the invention, a material promoting its adhesion to the wire is added to the paste or suspension constituting the carrier.

It is obvious that all active materials or carriers for active materials, e.g., in a finely divided state, may be used for practicing the process according to this invention. Thus, as initial materials, the following ones may be used: lead peroxide, litharge, minium, silver peroxide, zinc, nickel, cadmium, iron, copper and other suitable metals. The metal constituting the conductive wire may be hardened lead, iron, nickel-plated iron, nickel, silver, copper, zinc and other suitable materials. It is enough that the said metal is compatible with the technical requirements of the particular electrode application.

It is advantageous to use materials having interlacing or felting properties. For this purpose, particularly suitable material powders are those whose particles or crystals have an oblong or irregular shape, e.g., acicular, dendritic, arborescent or string-like shapes.

The diameter of the conductive wire may vary over a great range of values, e.g., from a few tenths of a millimeter to several millimeters. Such wire may be smooth, scoured or pickled, single-ply or multi-ply, the constituent strands in the latter case being either parallel or twisted.

According to an embodiment, the mixture which is to provide the coating for bearing the active material comprises:

High viscosity grade methyl cellulose gel in 3% aqueous solution—50 to 30% by weight;
Finely divided (sieved on a No. 250 sieve) silver peroxide—50 to 70% by weight.

According to another embodiment, the mixture which is to provide the coating for bearing the active materials comprises:

High viscosity grade methylcellulose gel in 3% aqueous solution—40 to 20% by weight;
Finely divided (sieved on a No. 250 sieve) electrolytic zinc—60 to 80% by weight.

According to still another embodiment, the mixture which is to provide the carrier coating comprises:

Nickel powder obtained by the decomposition of nickel carbonyl—40 to 60% by weight;

High viscosity grade methylcellulose gel in 2% aqueous solution—60 to 40% by weight.

It should be noted that the thickness of the layer constituting the porous metal carrier may be determined by regulating the degree of viscosity of the suspension or paste which is to provide it—the speed at which the wire is moved through it and—the time required, in the drying apparatus, for eliminating from the suspension the minimum amount of liquid necessary for preventing the suspension from running.

It has been observed that the thickness of the coating layer is independent of the diameter of the wire, and depended primarily upon the three parameters which have just been mentioned above. Therefore, it becomes possible either to deposit a layer having a large diameter around a wire of a few tenths of millimeter diameter, or a thin layer around a wire of several millimeters diameter; it being well understood that between these two extreme conditions all the intermediate combinations can be realized.

In order to impregnate the wire thus coated with a porous metal layer, according to the invention, a grooved barrel may be used. When said barrel has a horizontal axis, it is supported in a suitable solution so that its lower part is submerged into the solution.

Still according to the invention, it is possible, before passing the coated wire to the drying or sintering oven, to draw it through a draw-plate having suitable shapes and dimensions in order to give the coating the desired section which may be that of a circle, an ellipse, a rectangle, or a polygon. It may be advantageous to have coated wires with a selected section of a determined shape so that their assembly is easier.

According to still another characteristic of the invention, the wires of at least one polarity, after being coated with active material or with a sintered carrier eventually impregnated with active material, are covered with an electrically insulating coating or separator, that is, either permeable or semi-permeable, which is applied or deposited by a continuous process, the material constituting said separator being selected according to the nature of the wirelike electrodes as well as to the thickness which is desired for such a separator, or else to the nature of the electrolyte.

Such a method automatically ensures the mutual insulation of electrodes of opposite polarity.

According to another embodiment, the said separator is provided in the form of threads either woven or not, of strips, or of films or the like which are placed or wound around said wirelike electrode so that they constitute either a single layer or several superposed layers.

It is possible, according to the shape or the nature of the separator which is to be applied, to use machines of a known type such as ribboning, plaiting, lapping, knitting or garlanding machines.

According to another embodiment, the said separator is applied in the forms of a material having a liquid or pasty consistency, through which the wirelike electrode is passed so that a deposit is effected by coating with a thin film which is dried, gellified, coagulated or the like.

Such an operation may be effected by using a coating apparatus of a known type, said apparatus being possibly used in combination with the apparatuses which provide the coating and then the drying of the coating material.

Still according to the invention, one end of the said wirelike electrode is bared of the active material, or the sintered carrier that has either been or not been impregnated with active materials and also of the separator which covers it. The said electrodes are positioned in rows in such a way that the electrodes of one polarity alternate with those of the opposite polarity so that separate groups of bared ends are obtained, each group corresponding to a given polarity. The bared ends of the same group are electrically connected together and eventually groups of one polarity are connected together, so that two groups or series are obtained, such groups being connected respectively, the one (or several) to a positive terminal, the other (or others) to a negative terminal.

By dividing into two separate groups, the one positive, the other negative, the bared ends of the electrodes, the problem of their mutual connection and of their connection to the terminals of a cell may be notably simplified.

The cut sections of active material situated at the non-bared ends of the wires are also then insulated, while at the same time the said ends are protected in order to prevent any crumbling or disaggregation of the sintered carrier or of the active material on the wires at such ends.

The insulation and the protection of the non-bared ends of the electrodes are effected by coating said ends with a non-conductive material unaltered by acid or alkaline solutions so that any electrochemical or electronic conduction between them is prevented.

Due to this procedure, by consolidating the more brittle parts of the electrode, any risk of damage may be practically prevented.

The assembling of wires may be made in many different manners without departing from the scope of this invention. This assembling may be effected by arranging bundles obtained by associating successive rows of impregnated wires. In each row, the wires coated with positive active material alternate with those coated with negative materials. In two adjacent rows the wires of the same polarity are positioned in a staggered pattern.

It is obvious that when the section of the coated wires is circular there is necessarily a certain loss of space whereas if such section is polygonal, this loss is lessened in a very large measure or may be completely prevented.

Other objects, features and characteristics of the invention will become apparent from the following detailed description and the accompanying drawings which are only given as examples, and wherein:

FIGURE 1 diagrammatically shows an embodiment of the process according to the invention without any sintering operation;

FIGURE 2 is a cross-section of an impregnation tank;

FIGURE 3 is a longitudinal section of the same tank;

FIGURE 4 shows another embodiment of the process according to the invention which uses a sintering oven;

FIGURE 5 diagrammatically shows a section of a bundle of electrodes, arranged according to the invention;

FIGURE 6 diagrammatically shows the covering of an electrode by ribboning;

FIGURE 7 is a partly sectional view of an electrode provided with a separator constituted by superimposed ribbon layers;

FIGURE 8 diagrammatically shows the covering of an electrode by plaiting;

FIGURE 9 diagrammatically shows the covering of an electrode by coating, and

FIGURE 10 shows a sectional view of a cell according to the invention.

According to the embodiment of FIGURE 1, the reference character 1 denotes a spool or reel of the wire which is to be coated. The rotation of said spool can be slowed in conventional ways, e.g., by providing a brake rod 2 with a spring 3. The wire 4, coming from the spool, is passed around a pulley 5 and enters through the bottom of a container 6, containing the paste or the material which is to form the coating, the paste being one of those described herein. The supply of said paste is diagrammatically shown at 7. The coated wire leaving container 6 passes through a drier and/or oven 8 in which the circulation of hot gases is ensured, e.g., by a gas pipe 9 equipped with a fan 10. Passing out of drier 8, the wire is passed over a pulley 11, and leaves the apparatus at 12.

If desired, a suitable draw-plate 8a may be provided, said draw-plate being situated either at the entry to oven 8 or just beyond container 6. The purpose of such draw plate 8a is, as mentioned above, to give a determined shape to the section of the coated wire. When it leaves the apparatus which has just been described at 12, the wire is coated by the particular coating in container 6 either with a layer of porous sintered metal or with a layer of dried active material, which latter may be mixed with a suitable conductive material. The speed of passage through the apparatus is effected as by a motor 13, e.g., driving the pulley 11 by means of a belt 14.

After the wire coated with a porous sintered carrier has left said apparatus at 12, it may suitably be impregnated with suitable active positive and negative materials such, for instance, as nickel hydroxide and cadmium hydroxide or the like.

This impregnating operation takes place in a tank 15 containing the suitable impregnating solution and in which a cylinder 16 is partially submerged. On the outer surface of said cylinder helical grooves 17 may be provided (see FIGURE 3). The coated wire 4 to be impregnated arriving at 18 wound in several turns around barrel 16 in grooves 17 will dip into tank 15 wherein it is impregnated by the solution of selected material. It then leaves tank 15 at 19.

When sintering of the coating applied to the wire 4 is required, a sintering chamber 8b is located between the leaving end of the chamber 8 and pulley 11 as seen in FIGURE 4. The sintering oven 8b through which the wire passes may be provided an electrical heating winding 20 through which the coated wire 4 passes. Inside chamber 8b an inert or reducing atmosphere is maintained by circulating gases in the direction of arrows $F_1$ and $F_2$. Sintering occurs in oven 8b and the wire with its sintered coating then passes around pulley 11 of FIGURE 1.

FIGURE 5 shows a simple and practical way of arranging the coated wires according to the invention. In this figure, the sections of the positive wirelike electrodes P are represented as blank circles, whereas the sections of the negative wirelike electrodes N are represented as hatched circles. According to this example, all the wires are placed or aligned in rows A, B, C, D, etc. In each row, the wires P coated with positive active material alternate with wires N coated with negative active material. From one row to the other, the positions of wires N and P of different polarities are staggered. In other words, a direct contact in adjacent rows A, B, C, D, etc., between two wires of the same polarity is thus prevented.

All wires could also be positioned in a staggered pattern in order to save place or to provide groupings with special contours such, for instance, as a hexagonal contour or other selected contour.

Bundles of wires thus assembled may obviously be inscribed in contours of a suitable shape. As an example, FIG. 5 shows in lines drawn over the rest, an inscribed circular contour CC, an inscribed triangular contour TC, and an inscribed rectangular contour RC.

Cells made of such bundles thus obtained can have either the thickness of the coated wires, in which case only one row of aligned wires is used, or that of one of the three shapes CC, TC or RC which have been shown as examples.

The electrodes P and N obtained in the above-described way may be positioned relative to each other in such a way that there is no contact between electrodes of opposite polarities. In order, however, to simplify the assembly, it is, advantageous to insulate at least some of said electrodes by covering them with a separator.

The separators according to the invention intended for use with the described wirelike electrodes P and N may be grouped in three distinct classes according to their use in primary or secondary cells, and according to the chemical nature of the coating which they are to cover.

Thick separators, i.e., those having a thickness larger than 0.15 mm. (generally in the range of from 0.15 to 0.30 mm.) which may be made of any kind of papers, e.g., kraft paper, blotting paper, or which may be constituted by very tightly woven fabrics, such as twilled fabrics, or by felted fabrics.

Thin separators, i.e., those having a thickness in the range of from 0.05 to 0.15 mm. which may be made from bleached cellulose, or non-woven tissues, the fibers or threads of which are made of cotton, polyamides, copolymers of polyvinyl chloride, acrylic resins, polyesters, or other suitable synthetics or natural fibers.

Very thin separators, i.e., those having a thickness smaller than 0.05 mm. (generally in the range of from 0.02 to 0.05 mm.) which are preferably of the semipermeable type, and are made from thin films of regenerated cellulose of the kind called "cellophane" or of polyvinyl alcohol of the kind called "rhodoviol." This kind of separator is generally made of several superimposed films (generally from five to fifteen films).

FIGURE 6 shows a ribboning machine which uses ribbons or thin strips of any material and winds them in superposed coils around a wirelike electrode, in such a way that the turns constituting one layer abut one another or only separated by narrow intervals, the interval between two turns being covered by a turn in the following layer so that superpositions or overthicknesses which would constitute weak points in the separator, are prevented.

These machines may be used for applying separators made of paper, non-woven tissues, nylon tissues or others of appropriate selection.

In FIGURE 6, the wirelike electrode 21 enters the ribboning machine at a uniform speed in the direction of arrow $F_3$ by means of the moving pulley or windlass 22, itself driven by a motor or similar device (not shown). The machine comprises three heads 23, 24 and 25 each bearing two spools of selected ribbon 23a, 23b, 24a, 24b, 25a, 25b. The heads 23, 24 and 25 are driven with a rotative motion around the wirelike electrode 21, so that each winds two ribbons around the latter. The electrode 21 leaves the machine covered with its separator 26 made in the present case, by six superposed layers of ribbons.

It would, of course, be possible in the case where a larger number of layers is desired, either to use a machine comprising a larger number of heads or to place a larger number of ribbon spools on each head. In the opposite case, it would be possible to use a machine with a smaller number of heads.

FIGURE 7 shows a section of a wirelike electrode 21, covered with a separator 26 made of six ribbon layers. This figure clearly shows the distribution of the turns, the ribbon of a given layer covering the interval 27 of the underlying layer.

By using such a machine it is possible to cover a wirelike electrode 21, e.g., with a polyamide ribbon separator 26 made of a tightly woven fabric. Such a separator 26 is particularly well suited to sintered nickel carrier electrodes for cadmium-nickel alkaline cells which are to operate in a gastight way. The electrodes of a given polarity, e.g., positive electrodes, are covered by depositing two superposed layers of polyamide tissue ribbon, 0.12 mm. thick each, the intervals of the first layer being covered by the turns of the second one.

It is also possible, with such machines, to cover a wirelike electrode with a semi-permeable separator made from a film of regenerated cellulose of the kind called "cellophane" 0.02 mm. thick. Such a separator may be used to protect either positive electrodes made of silver powder sintered on a silver wire, or negative electrodes made from electrolytic zinc powder mixed with zinc oxide agglomerated by means of a suitable adhesive and deposited on a silver wire. Such electrodes are preferably intended for assembling silver-zinc cells. As an example, the layers of ribbon 27 are superposed on each electrode which brings the thickness of the separator to a total value of about 0.2 mm. in the dry state.

Textile threads may be used instead of ribbons and constitute sheaths which may be plaited, lapped, knitted, or merely garlanded. Naturally, different machines are used according to the desired kind of sheath. Such machines have lower efficiencies than ribboning machines, but are of a very advantageous use.

FIGURE 8 diagrammatically shows a plaiting machine with multiple spindles, which, for the sake of clearness, is provided with only eight spindles. The wirelike electrode 28 is driven at a uniform speed in the direction of arrow $F_4$ by means of a moving pulley or windlass (not shown) and placed at the outgoing end of the machine, as in the case of FIGURE 6.

Each spindle 29 bears a spool 30 of thread which may be of any nature, cotton, nylon, glass silk, dynel or other material. The spindles 29 are mounted vertically on a plate 31 of the machine and are borne by rods 32 mounted on cog-wheels 33 meshing with each other and set under the machine on a second plate 34 that is parallel with the first plate. A driven shaft 35 drives the said cog-wheels.

When the machine is moving, the spindles describe two trajectories, corresponding to two interlaced sinusoids 36 and 37 on the edge of plate 31. The spindles 29 move some in the direction of arrow $F_5$ the others in the direction of arrow $F_6$. The threads 38 of spools 30 which are wound and intercrossed around the wirelike electrode 28, make a continuous plait 39 which tightly clings to said electrode wire 28.

It is also possible as has been said hereabove, to deposit the separator on the electrode by means of a coating process.

Such process may be more especially applied to electrodes for use in primary or secondary cells in which a semi-permeable carrier is absolutely necessary, e.g., in the case of the silver-zinc, silver-cadmium, nickel-zinc or copper-zinc couples. In such case, a material having a liquid or pasty consistency such as polyvinyl alcohol, is used, said alcohol being easily soluble in pure water, thus giving a kind of more or less thick syrup which assumes the consistency of a gel in concentrated potassium hydroxide solutions. Thick solutions of this kind are very well suited to the coating of thin films around the wirelike electrodes, by using a continuous process similar to that used for coating the initial wire with active material or with a metal carrier which is to be sintered.

FIGURE 9 diagrammatically shows a continuous coating apparatus intended for depositing a semi-permeable film of polyvinyl alcohol on a wirelike electrode. An electrode thus coated may be constituted, e.g., by a silver wire coated with sintered silver powder or electrolytic zinc powder agglomerated by a suitable adhesive.

The wirelike electrode 40 is vertically stretched and is driven at a constant speed in the direction of arrow $F_7$ between a spool 41 and a driving windlass 42 driven by a motor (not shown). While travelling upwards the wirelike electrode first passes through a tank 43 into which it penetrates through the bottom, e.g., by passage through a perforated rubber plate 43a which latter prevents leakage.

Said tank 43 contains the coating material which may, for instance, be a polyvinyl alcohol solution at 25% in water, where a low viscosity polyvinyl alcohol is used, or it may be regenerated cellulose in solution.

The wirelike electrode thus coated then passes through a drier 44 in which circulates a hot air current preferably downwards in the direction of arrows $F_8$, and, now covered with its soft polyvinyl alcohol film or other film, is wound on a receiving spool 45.

The thickness of the layer constituting such a separator may be varied by controlling the degree of viscosity of the coating solution, upon the speed of driving the electrode through the coating bath and upon the time and temperature of the drying operation.

The wirelike electrodes P and N manufactured as hereabove described and previously cut to the required length are freed of the coating at one of their respective ends, said coating being either the active material or the sintered carrier impregnated or not and also the separator. This baring operation may be advantageously effected on any automatic baring machine of a known type. This baring of the wire may be made to any length, e.g., in the range of from 1 to 20 mm. Then, the other cut end of each bared wirelike electrode is covered with a layer of a material, e.g., a varnish which is unalterable in the electrolyte. Said varnish constitutes both an electrical insulation and a mechanical protection preventing the active material or the eventually impregnated carrier at the unbared cut end of the wire electrode from crumbling away. It may be deposited by any known process to a length which may be of about one millimeter.

The electrodes thus prepared are ready for assembly. Said electrodes, which may have any shape, straight, bent, plated or any other shape are placed in a support, groove or similar receptacle distributed according to their polarities and laid in one or several alternate layers.

The electrodes are positioned in such a way that all the bared ends of the same polarity be on the same side.

A suitable number of said positive and negative electrodes thus arranged is removed from the support and they are gathered in packets or bundles which are maintained tightly assembled by any suitable means such as retractable sheaths, elastic rings, adhesive strips or other binders. In the case of straight wirelike positive and negative electrodes, said electrodes are laid in the support grooves with their ends on opposite sides disposed in such a way that their bared ends protrude on each side. Then they are assembled in cylindrical bundles.

The cylindrical electrode bundles thus constituted are placed in casings or containers intended for receiving them, and they are preferably disposed in such a way that the bared ends of, e.g., negative wirelike electrodes are at the bottom of the casing. In order to connect the bared ends of individual electrodes together, a conductive material is provided in a divided shape so that it penetrates between the bared wires. For instance, at least two pads of very fine interlaced fibers are used, said fibers being made of non-corroding iron-chromium-nickel alloy, nickel-copper alloy, nickel, nickel-plated iron or other suitable conductive metal, said pads being placed in the casing in contact respectively with the bared ends of each of said electrodes bundles.

The casings or containers may have any desired shape, such as cylindrical; in this case, a flat pad of metal wool is placed at the bottom of the casing before introducing the electrodes, and said pad is fixed as by electrical spot-welding. A similar metal wool pad is placed over the upper end of the bundles. The required amount of electrolyte is introduced in the casing; said amount may be that which is necessary for impregnating by capillarity the bundles or blocks thus constituted, or it may comprise an excess over that. The casing is then closed by means of a cover or similiar device which is electrically insulated from the casing.

In order to ensure a perfect electrical contact, the metal wool is forced around the bared wire ends by compressing the pads. For this purpose, a suitable pressure is exerted upon them, e.g., at the moment of the closing of the casing or container. The penetration of the metal wool between the electrode ends causes at the same time a reduction of the space taken up by the whole.

FIGURE 10 diagrammatically shows a section of a gas-tight storage cell made according to the invention. The character 46 refers to a casing or container, having, e.g., a cylindrical shape, in which are housed straight wirelike electrodes, positive ones 47a and negative ones 47b. Said electrodes are arranged alternately according to their polarities and placed in opposite directions, so that their bared ends 48a and 48b are placed, the ones 48a at the top end of the casing and the others 48b at the bottom end. They are assembled in a compact bundle without lost space and maintained in this state by the means of an insulating sheath 49, made, e.g., of plastic material.

Said electrodes may, for instance, comprise a nickel wire core coated with sintered nickel powder impregnated with either nickel hydroxide eventually mixed with cobalt hydroxide, or cadmium hydroxide.

A pad 50 of metal wool, e.g., nickel wool is placed at the bottom of casing 46 and fastened to this bottom preferably by electrical spot-welding. The bared ends 48b are in contact with pad 50. A pad 51 also made of nickel wool, is placed at the upper end of the casing and is in contact with the bared ends 48a. Said pads 50 and 51 each have a thickness of a few millimeters, e.g., substantially the same as the length of the respecting bared ends of the electrodes.

The insulating sheath 49 surrounds the electrodes bundle and prevents any contact between pad 51 and casing 46. It also makes it easier to introduce the bundle of electrodes in the casing.

At the upper end of the casing, a ring 52 of non-conductive material is preferably provided, said ring preventing any contact between pad 51 and shoulder 53 of the casing 46.

The casing is closed by a cover 54 crimped at its upper part through an insulating ring-shaped joint 55. A metal pad 56 of the same material as the aforesaid pads 50 and 51 is fastened to the cover 54, e.g., by spot welding and makes contact with the upper pad 51.

When, after the suitable amount of electrolyte has been introduced, the cover 54 is put in its place, the pad 56 must, in order to take its own places, push pad 51 and electrodes 47a and 47b towards the bottom of the casing. This causes a compressing of the pads while forcing and bending the bared ends 48a and 48b inside the pad with which they cooperate.

While specific embodiments of the invention have been described and shown, variations within the scope of the appended claims are possible and are contemplated. There is no intention of limitation to the exact disclosure herein made.

What is claimed is:

1. In a process for manufacturing wire type electrodes for primary and secondary cells, the steps comprising passing a conductive wire through a suspension of a coating material including active electrode material, drying the coated wire, thereafter applying an insulating covering to the coated dried wire, then severing the so-treated wire into prescribed lengths, baring a portion of the wire at one of the cut ends of each severed length and covering its other cut end with protective insulation.

2. In a process for manufacturing wire type electrodes for primary and secondary cells, the steps comprising coating conductive wires respectively with coatings including active positive and negative materials respectively, applying an insulating covering to at least one of the coated wires, then severing the so-treated wires into prescribed lengths to provide respectively wirelike positive and negative electrodes, baring a portion of the wire at one of the cut ends of each severed length to expose the wire thereat, covering the other cut ends of each electrode with protective insulation, assembling the cut electrode lengths in rows with positive and negative electrodes disposed in alternation and with all exposed wire portions of positive electrodes at one side and all exposed wire portions of negative electrodes at the opposite side and making bundles of selected groups of said assembled cut electrode lengths.

3. A process for manufacturing wire type electrodes for primary and secondary cells comprising coating wirelike members respectively with negative and positive active materials, applying an insulating separator on various of the coated wirelike members to prevent contact between electrodes of opposite polarity, cutting the coated wirelike members into prescribed lengths, assembling cut lengths of said wirelike members in rows with positive and negative lengths disposed in alternation and then making bundles of selected groups of said assembled cut-lengths.

4. In a process for manufacturing wire type electrodes for primary and secondary cells, the steps comprising passing a conductive wire through a pasty suspension comprising a mixture of conductive powder and powdered active material with a suspending agent to coat the wire, regulating the thickness and cross-sectional shape of the coating, drying the coating bearing wire, thereafter severing the so-treated wire into prescribed electrode lengths, baring a portion of the wire at one of the cut ends of each severed length, and covering its other cut end with protective insulation.

5. In the process of claim 4, said suspending agent comprising an aqueous solution of methyl cellulose gel and wherein said conductive powder comprises nickel powder derived from the decomposition of nickel carbonyl and said active material is selected from the group consisting of silver peroxide and electrolytic zinc.

6. The process according to claim 4 including the step of covering the coated wire with an insulating covering.

7. The process according to claim 6 wherein said insulating covering comprises turns of insulative ribbon wound about the coated wire in a plurality of layers.

8. The process according to claim 6 wherein said insulating covering comprises a plaited sheath of insulative material.

9. The process according to claim 6 wherein said insulating covering comprises an insulating film deposited on the coated wire.

10. The process of claim 4 wherein said conductive power and powdered active materials possess interlacing and felting properties.

11. The process of claim 10 wherein said conductive powder and powdered active materials are powders selected from the group consisting of dendritic, acicular, arborescent and string-like materials.

12. In a process for manufacturing wire type electrodes for primary and secondary cells, the steps comprising passing a conductive wire through a pasty suspension comprising a mixture of conductive powder and a suspending agent to coat the wire therewith, regulating the thickness and cross-sectional shape of the coating, drying the coating bearing wire, sintering the conductive powder of the coating, then impregnating the sintered coating with active material, thereafter severing the so-treated wire into prescribed electrode lengths, baring a portion of the wire at one of the cut ends of each severed length and covering its other cut end with protective insulation.

13. In the process of claim 12, said suspending agent comprising an aqueous solution of methylcellulose and wherein said conductive powder is nickel derived from the decomposition of nickel carbonyl and wherein said active material is a reaction product of a metal salt solution reacted with sodium hydroxide solution.

14. The process of claim 12 wherein said conductive powder and said active material possess interlacing and felting properties.

15. The process according to claim 12 including the step of covering the coated wire with an insulating covering.

16. The process according to claim 15 wherein said insulating covering comprises turns of insulative ribbon wound about the coated wire in a plurality of layers.

17. The process according to claim 15 wherein said insulating covering comprises a plaited sheath of insulative material.

18. The process according to claim 15 wherein said insulating covering comprises an insulating film deposited on the coated wire.

19. The process according to claim 12 wherein said conductive powder is selected from the group consisting of dendritic, acicular, arborescent and string-like materials.

20. In a process for manufacturing wire type electrodes for primary and secondary cells, the steps comprising passing a conductive wire through a pasty suspension comprising 50 to 30% by weight of high viscosity grade methylcellulose gel in 3% aqueous solution, and 50 to 70% by weight of finely divided silver peroxide to coat the wire, drying the coating bearing wire and thereafter severing the so-treated wire into prescribed electrode lengths.

21. In a process for manfuacturing wire type electrodes for primary and secondary cells, the steps comprising passing a conductive wire through a pasty suspension comprising 40 to 20% by weight of high viscosity grade methylcellulose gel in 3% aqueous solution and 60 to 80% by weight of finely divided electrolytic zinc to coat the wire, drying the coating bearing wire and thereafter severing the so-treated wire into prescribed electrode lengths.

22. In a process for manfuacturing wire type electrodes for primary and secondary cells, the steps comprising passing a conductive wire through a pasty suspension comprising 60 to 40% by weight of high viscosity grade methyl cellulose in 2% aqueous solution and 40 to 60% by weight of nickel powder derived from the decomposition of nickel carbonyl, drying the coating bearing wire, sintering the nickel powder of the coating onto the wire, impregnating the sintered mass with suitable active materials and thereafter severing the so-treated wire into prescribed electrode lengths.

23. In the process of claim 2, the additional steps of placing a bundle of said assembled cut electrodes into an electrically conductive casing having a conductive wire pad at one closed end so that the bared wire portions at one side of said bundle are electrically inter-engaged with said pad and electrically connected to said closed end of said casing, adding electrolyte to the casing and applying a metal wool pad to the other side of said bundle so that the bared wire portions at the second side of the bundle are interengaged with said second pad, and then applying a sealing conductive cover over said second pad and in electrical connection therewith while maintaining said cover insulated from said casing whereby said closed end of said casing and said cover become the terminals of said cell.

24. A cell with wirelike electrodes comprising a casing having a closed end and a cover at its opposite end, means insulating the cover from the casing, parallelly disposed wirelike positive and negative electrodes in the casing each bearing coatings respectively of positive and negative active materials and each having a bared wire portion at an end thereof and being disposed in said casing with the bared wire portions of the respective positive and negative electrodes lying at opposite ends of said casing, wire pad means adjacent the closed end of said casing in which the bared ends in proximity thereto are inter-engaged, wire pad means at the cover end of said casing in which the bared ends in proximity thereto are interengaged and means interconnecting said cover and said second-named wire pad means whereby said casing forms one terminal of said cell and said cover the other terminal thereof.

25. The cell of claim 24 including an insulating jacket about said casing.

26. The cell of claim 24 wherein separator means covers the coated surfaces of electrodes therein.

27. The cell of claim 24 including a plurality of positive and negative wirelike electrodes arranged as a bundle and each electrode having a bared wire portion at one end thereof, all the bared wire portions of the positive electrodes extending from one side of said bundle and all the bared wire portions of the negative electrodes extending from the other side of the bundle, said respective wire pad means respectively serving to interconnect the bared wire ends that are interengaged therewith.

28. The cell of claim 24 including a third wire pad secured to said cover and interengaging said second-named wire pad means.

29. The cell of claim 24 wherein said wirelike electrodes comprise nickel wire coated with nickel powder and impregnated respectively with negative and positive active materials.

30. The cell of claim 24 wherein said wirelike electrodes comprise metal wire coated respectively with active positive and negative materials.

31. The cell of claim 24 including a plurality of positive and negative wirelike electrodes and insulative separators surrounding various of the electrodes to prevent electrical contact between electrodes of like polarity.

32. The cell of claim 31 wherein said separators comprise sheaths surrounding the respective electrodes of wound turns of insulative material.

33. The cell of claim 31 wherein said separators comprise sheaths of plaited insulative material.

34. The cell of claim 31 wherein said separators comprise films of insulating material.

35. The cell of claim 24 wherein said wire pads are compressed to embed the bared wire portions interengaged therewith securely to provide effective electrical contact therewith.

References Cited by the Examiner

UNITED STATES PATENTS

| | | | |
|---|---|---|---|
| 2,820,078 | 1/58 | Salauze | 136—19 |
| 2,823,246 | 2/58 | Lang | 136—139 |

FOREIGN PATENTS

| | | |
|---|---|---|
| 676,662 | 7/52 | Great Britain. |

JOHN H. MACK, *Primary Examiner.*